3,476,820
PROCESS FOR PRODUCING CYCLO-DODECATRIENE-(1,5,9)

Junji Furukawa, Kyoto, Hiroyuki Morikawa, Tatsuki-shi, Osaka, and Ryuzo Yamamoto, Toyonaka-shi, Osaka, Japan, assignors to Mitsubishi Petrochemical Co., Ltd., Chiyoda-ku, Tokyo, Japan
No Drawing. Filed Oct. 2, 1967, Ser. No. 672,013
Claims priority, application Japan, Oct. 14, 1966, 41/67,208
Int. Cl. C07c *13/02, 3/06*
U.S. Cl. 260—666                  2 Claims

ABSTRACT OF THE DISCLOSURE

Process for producing cyclododecatriene-(1,5,9) by reacting butadiene in the presence of a catalyst consisting of polyalkyltitanate and dialkylaluminium monochloride

BACKGROUND OF THE INVENTION

Field of the invention

This invention relates to a process for producing cyclododecatriene-(1,5,9) from butadiene.

Description of the prior art

Heretofore, there have been various studies with regard to the process for producing cyclododecatriene-(1,5,9) by using Ziegler catalysts containing titanium compounds. For example, $TiCl_4$-$AlR_2Cl$ as described in Japanese Patent Publication No. 2372/60; $TiCl_4$-$AlR_3$ as described in Japanese Patent Publication No. 6170/61; $Ti(OR)_4$-$AlR_nCl_{3n}$ ($1<n<3$) as described in Japanese Patent Publication No. 7765/64 and $Ti(C_6H_5COO)_4$-$AlEt_2Cl$ as disclosed in Japanese Patent Publication No. 21617/65 have been known.

Summary of the invention

We have conducted a thorough study with regard to various catalyst used in the production of cyclododecatriene-(1,5,9) from butadiene. As a result, we have found that a unique effect may be obtained by reacting butadiene in the presence of a catalyst composition consisting of polyalkyltitanate and dialkylaluminium monochloride.

Polyalkyltitanate which is used as a component of the catalyst compositions in the process of this invention is synthesized by a process, for example, described in "Journal of the Industrial Chemical Society of Japan," Minami et al., vol. 58, p. 32 (1955). The polyalkyltitanates used in the process of this invention have a number average molecular weight of 400–3000.

Although polyalkyltitanates have been used for heat-resistant paint heretofore, it has never been known that these compounds exhibit a catalyst activity when they are combined with dialkylaluminium monochloride.

Moreover, these catalyst compositions have features in that they are all soluble in an inert solvent such as benzene, toluene, hexane or the like, and that they are fairly stable in air for a prolonged period of time.

In contrast with the instabilities of titanium halides or alkoxides in air, these polyalkyltitanate catalyst compositions are easier to handle, and thus, they are quite preferable from a standpoint of commercial operation.

In addition, there is brought about a unique effect in that the selectivity of trans,trans,trans-form of the product cyclododecatriene-(1,5,9) is remarkably increased, when the present catalyst compositions are used under a suitable condition, i.e. if a weight ratio of polyalkyltitanates to dialkylaluminium monochloride as a reducing agent is selected within the range of 1:2–50.

In general, the process of this invention is carried out in an inert solvent, for example, aliphatic, aromatic or halogenated hydrocarbons, and aromatic hydrocarbons such as benzene, toluene and xylene are particularly preferable.

The proportion of polyalkyltitanate to dialkylaluminium monochloride used in the process of this invention is 1:2–50 in a weight ratio.

The reaction may be carried out at a temperature of from −20° to 100° C. and a preferable temperature ranges 30–60° C.

The reaction may be carried under a normal or an elevated pressure.

The isomer of the reaction product may be separated by way of a fractional distillation or a fractional crystallization.

Cyclododecatriene-(1,5,9) obtained according to the process of this invention is an important starting material in the organic synthesis. For example, lauryl lactam which is a starting material in the production of nylon-12 may be obtained by epoxydizing cyclododecatriene-(1,5,9) using peracetic acid, hydrogenating the resulting epoxide to give a saturated epoxide, rearranging the same to ketone by using magnesium iodide, converting the same to oxime by using hydroxylamine and rearranging the oxime to lauryl lactam. Furthermore, if the hydrogenated product mentioned above is oxidized to give the corresponding dicarboxylic acid according to the conventional process, there is produced a material having a utility in the production of synthetic resins.

In producing these various derivatives, the content of trans,trans,trans-form in the starting cyclododecatriene-(1,5,9) is an important factor and, in this regard, the process of this invention which is capable of producing cyclododecatriene-(1,5,9) having a high content of trans, trans, trans-form is extremely useful.

Description of the Preferred Embodiment

This invention will be explained more practically in the following examples. It should not be construed, however, that these examples restrict this invention as they are given merely by way of illustration:

EXAMPLE 1

Forty cc. of anhydrous benzene and 0.34 g. of polybutyltitanate having an average molecular weight of 610 were added to a 150 cc. capacity pressure-resistant glass autoclave and there was further added 1.21 g. of aluminium diethylchloride slowly so that the weight ratio of aluminium compound to titanium compound was 3.56, and 7 g. of butadiene was charged thereinto under nitrogen atmosphere. The reactor was sealed and stirred at 40° C. for 30 hours. At the end of the period, methanol-hydrogen chloride solution was added to decompose the catalyst. After the hydrogen chloride solution was separated, the organic fraction was distilled. There was obtained 4.36 g. of cyclododecatriene-(1,5,9) as a fraction having a boilpoint point of 60–70° C./3 mm. Hg. The yield corresponded to 64% of the reacted butadiene.

The structure of the resulting cyclododecatriene was confirmed by a gas chromatography and an infrared absorption spectrography to be composed of 67% of trans,trans,trans-cyclododecatriene and 33% of trans, trans-ciscyclododecatriene.

EXAMPLE 2

Forty cc. of anhydrous benzene, 0.34 g. of polybutyltitanate having an average molecular weight of 690 were added to the same reactor as in Example 1 and there was added 1.21 g. of aluminium diethylchloride so that the weight ratio of aluminium compound to titanium compound was 3.56, and then 7 g. of butadiene was charged to the reactor. Thereafter the same procedures as described in Example 1 were followed.

There was obtained cyclododecatriene-(1,5,9) in a yield of 3.56 g., which corresponded to 59.6% of the reacted butadiene.

The resulting cyclododecatriene consisted of 74.5% of trans,trans,trans-cyclododecatriene and 25.5% of trans,trans,cis-cyclododecatriene.

EXAMPLE 3

Forty cc. of anhydrous benzene, 0.34 g. of polybutyltitanate having an average molecular weight of 690 were added to the same reactor as in Example 1 and there was added 1.605 g. of aluminium diethylchloride so that the weight ratio of aluminium compound to titanium compound was 4.71, and then 7 g. of butadiene was charged to the reactor. Thereafter the same procedures as in Example 1 were followed.

There was obtained cyclododecatriene-(1,5,9) in a yield of 3.12 g. which corresponded to 57.5% of the reacted butadiene.

The resulting cyclododecatriene consisted of 83% of trans,trans,trans-cyclododecatriene and 17% of trans,trans-cis-cyclododecatriene.

EXAMPLE 4

Forty cc. of anhydrous benzene, 0.34 g. of polybutyltitanate having an average molecular weight of 1300 were added to the same reactor as in Example 1 and there was added 1.21 g. of aluminium diethylchloride so that the weight ratio of aluminium compound to titanium compound was 3.56, and then 7 g. of butadiene was charged to the reactor. Thereafter the same procedures as described in Example 1 were followed.

There was obtained cyclododecatriene-(1,5,9) in a yield of 4.4 g. which corresponded to 65.6% of the reacted butadiene.

The resulting cyclododecatriene consisted of 62% of trans,trans-trans-cyclododecatriene and 39% of trans,trans,cis-cyclododecatriene.

EXAMPLE 5

Forty cc. of anhydrous benzene, 0.34 g. of polybutyltitanate having an average molecular weight of 1600, 1.21 g. of aluminium diethylchloride and 7 g. of butadiene were added to the same reactor as in Example 1 and the same procedures as described in Example 1 were followed thereafter.

There was obtained cyclododecatriene-(1,5,9) in a yield of 3.60 g. which corresponded to 69% of the reacted butadiene.

The resulting cyclododecatriene consisted of 67.5% of trans,trans,trans-cyclododecatriene and 32.5% of trans,trans,cis-cyclododecatriene.

EXAMPLE 6

Forty cc. of anhydrous benzene, 0.34 g. of polybutyltitanate having an average molecular weight of 2100, 1.21 g. of aluminium diethylchloride and 7 g. of butadiene were added to the same reactor as in Example 1 and the same procedures as in Example 1 were followed thereafter.

There was obtained cyclododecatriene in a yield of 4.9 g. which corresponded to 73% of the reacted butadiene. The resulting cyclododecatriene consisted of 62.2% of trans,trans,trans-cyclododecatriene, and 37.8% of trans,trans,cis-cyclododecatriene.

We claim:
1. Process for producing cyclododecatriene-(1,5,9) which comprises bringing butadiene into contact with a catalyst consisting of polybutyltitanate and diethylaluminium monochloride.
2. Process according to claim 1 wherein the proportion of polybutyltitanate to diethylaluminium monochloride is from 1:2 to 1:50 in a weight ratio.

References Cited

UNITED STATES PATENTS 3,250,817   5/1966   Lapporte.
3,303,226   2/1967   Yuguchi.

OTHER REFERENCES

Chem. Abst., vol. 62:2722a, 1965 abstract of Japanese Patent 7765–('64), May 18.

DELBERT E. GANTZ, Primary Examiner

V. O'KEEFE, Assistant Examiner